(12) United States Patent
Yoshihara et al.

(10) Patent No.: US 7,448,635 B2
(45) Date of Patent: Nov. 11, 2008

(54) RECREATIONAL VEHICLE

(75) Inventors: Masanori Yoshihara, Shizuoka (JP); Kiyoteru Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 239 days.

(21) Appl. No.: 11/346,512

(22) Filed: Feb. 2, 2006

(65) Prior Publication Data

US 2007/0176388 A1 Aug. 2, 2007

(51) Int. Cl.
*B60G 21/055* (2006.01)

(52) U.S. Cl. .............................................. 280/124.107

(58) Field of Classification Search .......... 280/124.106, 280/124.107, 124.137, 124.152; 180/183, 180/190
See application file for complete search history.

(56) References Cited

U.S. PATENT DOCUMENTS

| 4,033,605 | A | * | 7/1977 | Smith et al. | 280/6.157 |
| 4,842,298 | A | * | 6/1989 | Jarvis | 280/124.154 |
| 5,029,664 | A | * | 7/1991 | Zulawski | 180/190 |
| 5,810,338 | A | * | 9/1998 | Koenig et al. | 267/273 |
| 6,318,710 | B1 | * | 11/2001 | Anderson et al. | 267/273 |
| 6,866,110 | B2 | | 3/2005 | Mallette et al. | |
| 6,942,051 | B2 | * | 9/2005 | Mallette et al. | 180/183 |
| 2006/0082093 | A1 | * | 4/2006 | Sterly et al. | 280/124.106 |
| 2006/0103101 | A1 | * | 5/2006 | Sowinski et al. | 280/124.107 |

* cited by examiner

*Primary Examiner*—Paul N. Dickson
*Assistant Examiner*—Robert A. Coker
(74) *Attorney, Agent, or Firm*—Keating & Bennett, LLP (57) ABSTRACT

A recreational vehicle includes a vehicle frame, a pair of left and right arms attached to the vehicle frame and extending from the left and right sides of the vehicle frame, a pair of left and right ground contacting parts respectively attached to the pair of left and right arms, and a stabilizer bar for correcting a torsion on the pair of left and right ground contacting parts. The stabilizer bar is provided with a support member capable of changing a position at which the stabilizer bar is supported.

16 Claims, 10 Drawing Sheets

RECREATIONAL VEHICLE

BACKGROUND OF THE INVENTION

1. Field of the Invention

The present invention relates to vehicles such as snowmobiles, all terrain vehicles (ATVs), and other related vehicles, hereinafter "recreational vehicles", although the present invention should not be construed to be limited only to the vehicles or types of vehicles described herein.

2. Description of the Related Art

A stabilizer bar for correcting the torsion on a pair of ground contacting parts (the left-right height differences of the pair of ground contacting parts) is generally known as a technology utilized for correcting the roll of recreational vehicles. The stabilizer bar is supported parallel to the left-right direction of a vehicle and curves on both ends and is supported by two end portions. Generally, the two end portions are supported by members (for example, a lower arm of a double wishbone suspension) attached to the pair of left-right ground contacting parts. An example can be found in U.S. Pat. No. 6,866,110. According to FIG. 15 of this publication, the end portions of a stabilizer bar 292 are inserted through pivot blocks 288, 290 and supported by lower arms 246, 250, and the pivot blocks 288, 290 are capable of sliding along the left and right sides of the vehicle body.

In view of the above-described stabilizer bar, it is difficult to adjust the strength of the stabilizer bar (hereinafter the rigidity of the stabilizer bar) to correct the torsion. Moreover, if the rigidity of the stabilizer bar is to be easily adjustable in a wide range, the reactive force of the stabilizer bar with respect to the force received by the ground contacting parts could not be readily produced. In addition, a rigid stabilizer bar could not be provided without increasing the cost and weight of the stabilizer bar.

More specifically, the rigidity of the stabilizer bar depends on the length, shape, and diameter of stabilizers attached to the supporting parts on the vehicle side and the arm side. However, in the known technology described above, such factors could not be adjusted. Particularly, in view of the stabilizer bar shown in FIG. 15 of U.S. Pat. No. 6,866,110, the distance between the shaft in the longitudinal direction of the stabilizer bar 292 extending in the left-right direction of the vehicle and the pivot blocks 288, 290 significantly contributes to the rigidity of the stabilizer bar 292. However in the above-described known technology, this distance could not be adjusted.

Recreational vehicles are generally used to travel on uneven terrains of different height, hardness, etc. Therefore, there is a need for riders to appropriately adjust the rigidity according to self preference and the condition of the terrain.

According to U.S. Pat. No. 6,866,110, the pivot blocks 288, 290 that support the stabilizer bar 292 can slide in the left-right direction with respect to the lower arms 246, 250. However, with such a configuration, the force received by the ground contacting parts could not be readily transferred to the stabilizer bar. The inventors of the present application discovered that due to the sliding of the stabilizer bar 292, the correction of the torsion by the stabilizer bar could not be readily and effectively performed.

Moreover, although the stabilizer bar 292 includes two substantially perpendicularly curved portions, such a shape is not particularly desirable for providing a rigid stabilizer bar. The rigidity of the stabilizer bar can be increased by utilizing more rigid and thicker materials, but this will in turn increase the cost and weight of the stabilizer bar.

SUMMARY OF THE INVENTION

In order to overcome the problems described above, preferred embodiments of the present invention provide a recreational vehicle including a stabilizer bar of which the rigidity can be readily adjusted, the correction effects with respect to the force received by the ground contacting parts can be readily and effectively achieved, and the rigidity can be increased without increasing the cost and weight thereof.

A recreational vehicle according to a preferred embodiment includes a vehicle frame, a pair of left and right arms attached to the vehicle frame and extending from the left and right sides of the vehicle body, a pair of left and right ground contacting parts respectively attached to the pair of left and right arms, and a stabilizer bar for correcting a torsion on the pair of left and right ground contacting parts, wherein the stabilizer bar is provided with a support member capable of changing a position at which the stabilizer bar is supported.

In one of the preferred embodiments, the support member can change the position at which the stabilizer bar is supported in at least the front-rear direction of the vehicle body.

In one of the preferred embodiments, the stabilizer bar is supported by the arm and the vehicle frame, and the support member is attached to the vehicle frame.

It is preferable that the support member includes a bushing provided with a hole into which the stabilizer bar is inserted, an engaging member to which the bushing engages, and a housing attached to the vehicle frame.

It is preferable that the bushing can be engaged with the engaging member in different directions, and a position of the center of the hole, with respect to the housing, differs in each different direction.

It is preferable that the housing can be attached to the vehicle frame in different directions, and the position of the bushing, with respect to the vehicle frame, differs in each different direction.

In one of the preferred embodiments, the stabilizer bar is provided with an arm support member supporting the stabilizer bar on the arm, a hole for the stabilizer bar to be inserted is provided in the arm support member, and the arm support member is attached to the arm such that the arm support member is rotatable using the arm as an axis.

In one of the preferred embodiments, the arm includes a lower arm and an upper arm provided above the lower arm.

In addition, a recreational vehicle according to another preferred embodiment of the present invention includes a vehicle frame, a pair of left and right arms attached to the vehicle frame and extending from the left and right sides of the vehicle body, a pair of left and right ground contacting parts respectively attached to the pair of left and right arms, and a stabilizer bar for correcting a torsion of the pair of left and right ground contacting parts, wherein the stabilizer bar is provided with a pair of arm support members, and the arm support members are respectively attached to the pair of left and right arms such that the arm support member is immovable in the direction parallel to an axis of each of the pair of left and right arms.

In one of the preferred embodiments, a hole into which the stabilizer bar is inserted is provided in the arm support member, and a portion of the inner diameter of the hole is substantially the same as the external diameter of the stabilizer bar and another portion of the inner diameter of the hole is larger than the external diameter of the stabilizer bar.

It is preferable that the stabilizer bar can pivot in a plane parallel to the axis of the arm with a portion of the internal diameter serving as a supporting point.

A recreational vehicle according to another preferred embodiment of the present invention also includes a vehicle frame, a pair of left and right arms attached to the vehicle frame and extending from the left and right sides of the vehicle body, a pair of left and right ground contacting parts respectively attached to the pair of left and right arms, a stabilizer bar for correcting a torsion of the pair of left and right ground contacting parts, a support member supporting the stabilizer bar on the vehicle frame, and an arm support member supporting the stabilizer bar on the arm, wherein substantially an entire portion of the stabilizer bar between the support member and the arm support member is bent.

It is preferable that a flexural rigidity of the stabilizer bar, which determines a degree of flexure in the stabilizer bar with the support member serving as a supporting point, decreases along the portion from the support member to the arm support member.

It is preferable that a moment of inertia of area of the stabilizer bar which determines the flexural rigidity decreases along the portion from the support member to the arm support member.

In one of the preferred embodiments, the support member rotatably supports the stabilizer bar using the stabilizer bar as an axis, and an area of cross section, which is perpendicular to the horizontal plane and parallel to the left-right direction of the vehicle body, of the stabilizer bar decreases along the portion from the support member to the arm support member.

In one of the preferred embodiments, the portion of the stabilizer bar between the support member and the arm support member forms a part of an ellipse, and the curvature of the portion of the stabilizer bar increases along the portion from the support member to the arm support member.

In addition, a recreational vehicle according to another preferred embodiment of the present invention includes a vehicle frame, a pair of left and right arms attached to the vehicle frame and extending from the left and right sides of the vehicle body, a pair of left and right ground contacting parts respectively attached to the pair of left and right arms, a stabilizer bar for correcting a torsion of the pair of left and right ground contacting parts, a support member supporting the stabilizer bar on the vehicle frame, and an arm support member supporting the stabilizer bar on the arm, wherein a portion of the stabilizer bar between the support member and the midpoint of the support member and the arm support member includes no linear portion.

In one of the preferred embodiments, the portion between the support member and the midpoint of the support member and the arm support member form a part of an ellipse.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Hereafter, preferred embodiments of the invention will be described in the following order with reference to the drawings. It should be noted that the terms "left", "right", "front", "rear", "up" and "down" used in this specification are defined, unless otherwise specified, according to the normal, forward traveling direction of the vehicle being described. The present invention however is not limited to the following preferred embodiments.

Figure 1:
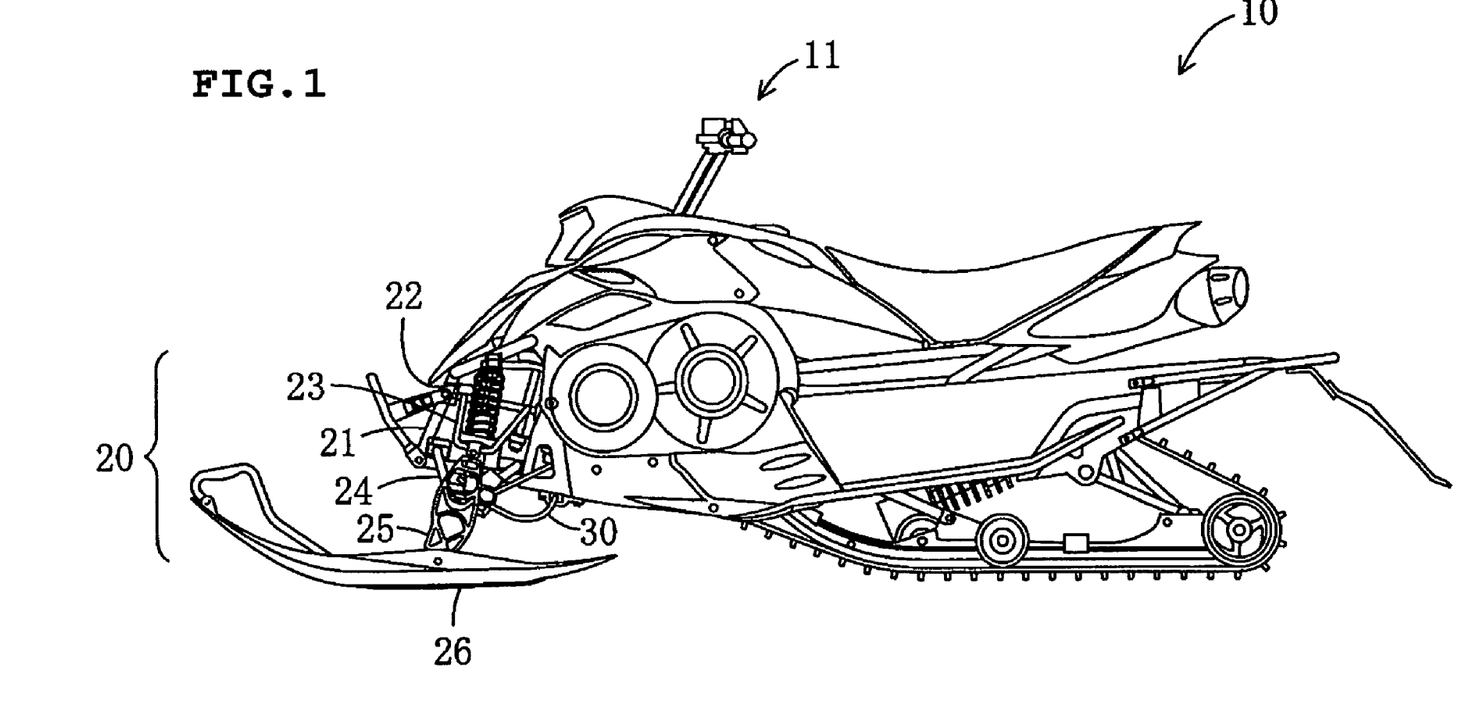
FIG. 1 is a left side view of a snowmobile according to a preferred embodiment of the present invention.
Figure 2:
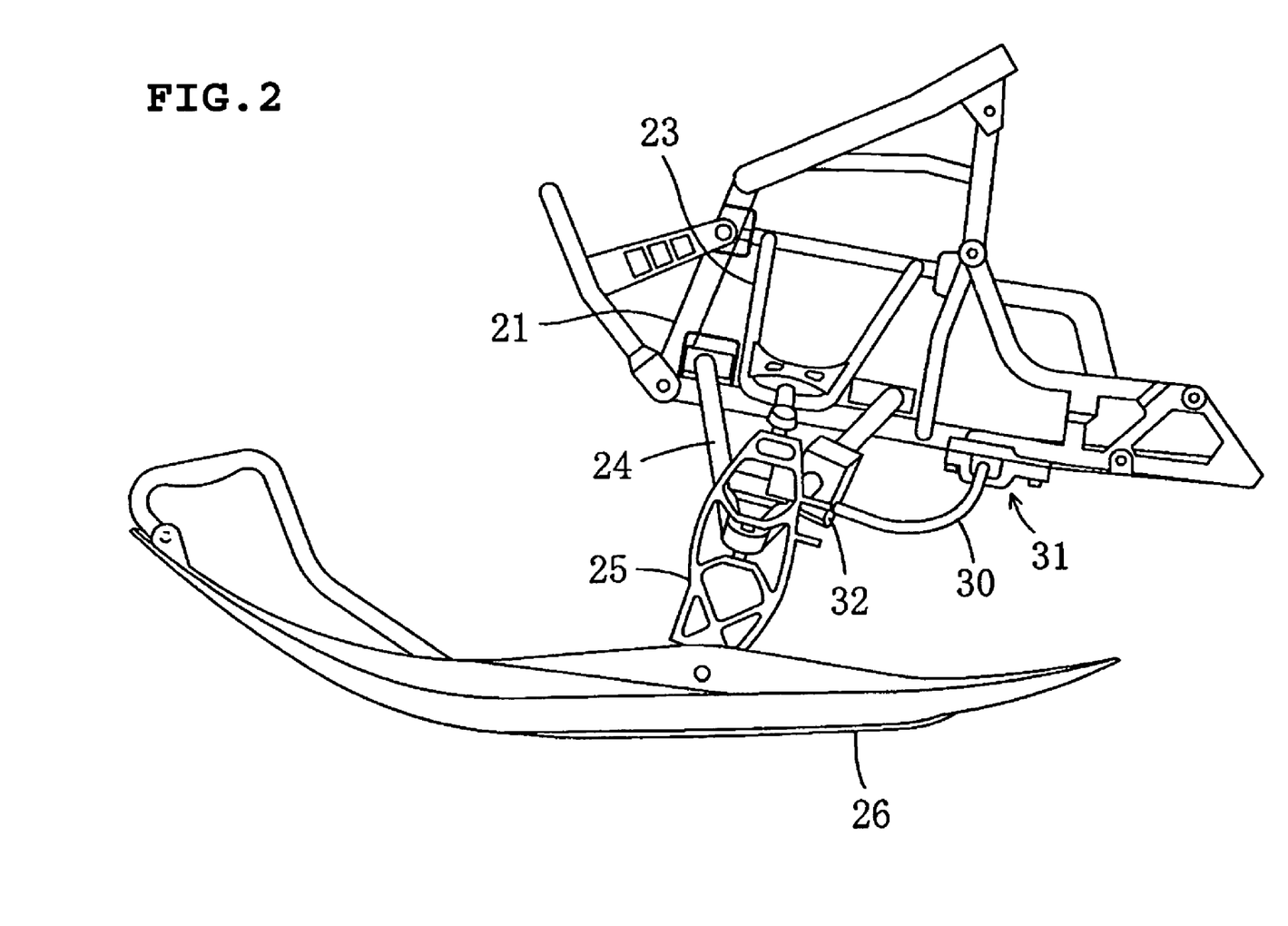
FIG. 2 is a left side view of a suspension.
Figure 3:
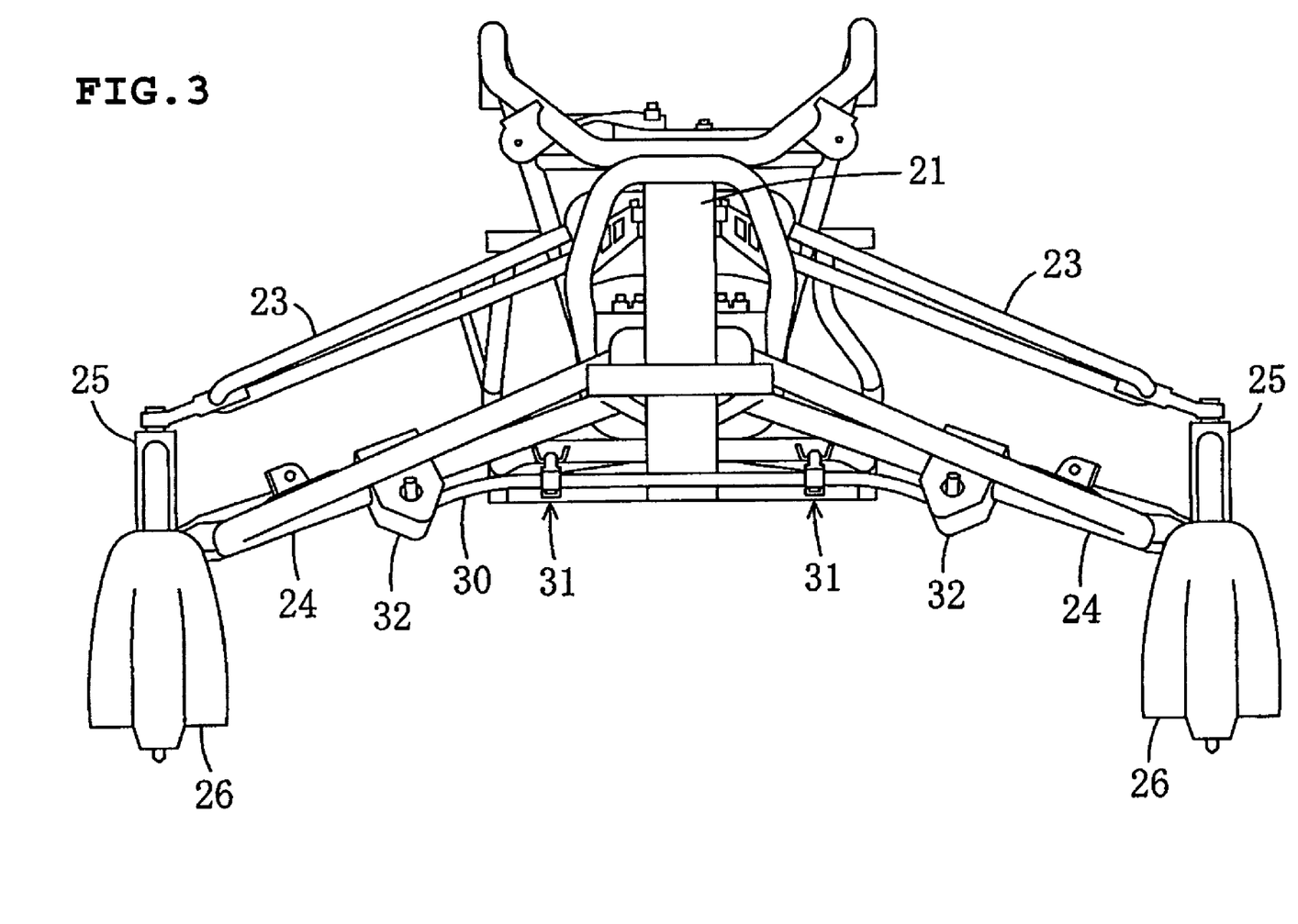
FIG. 3 is a front view of the suspension.

FIG. 1 is a left side view of a snowmobile 10 according to a preferred embodiment of the present invention. FIGS. 2 and 3 are drawings illustrating a suspension, wherein FIG. 2 is a left side view and FIG. 3 is a front view of the suspension. In FIGS. 2 and 3, a shock absorber is omitted to simplify the drawings.

Snowmobile 10 includes vehicle frame 21 that spans the entire vehicle body, and an engine is mounted onto the vehicle frame 21 at the center of the vehicle slightly toward the front. Snowmobile 10 also includes handlebar 11. A driving force from the engine is transferred to a track belt, which is provided at the rear portion of snowmobile 10, thereby driving snowmobile 10 forward or backward, while being steered by handlebar 11. Snowmobile 10 includes a suspension 20 provided at the front portion of the vehicle body. Suspension 20 is provided with shock absorbers 22, upper arms 23, lower arms 24, knuckles 25, skis 26, and a stabilizer bar 30. The following description will be made with reference to one side of snowmobile 10 with the understanding that the other side of snowmobile 10 includes similar features.

In this preferred embodiment, suspension 20 is a double wishbone suspension. Therefore, shock absorber 22 is elastic in the axial direction thereof and is a mechanism for reducing forces that cause expansion and contraction by using a spring and a damper. Shock absorber 22 is attached to vehicle frame 21 at one end and to lower arm 24 at the other end. Shock absorber 22 is rotatably attached to an axis of vehicle frame 21 and an axis of lower arm 24. Therefore, shock absorber 22 has the flexibility to rotate with respect to vehicle frame 21 and lower arm 24, and reduces forces acting between vehicle frame 21 and lower arm 24 by expansion and contraction.

Upper arm 23 and lower arm 24 are attached to knuckle 25, and knuckle 25 is attached to ski 26. Hence, forces from the snow surface received by ski 26 are transferred to knuckle 25, and the forces received by knuckle 25 are in turn transferred to vehicle frame 21 via upper arm 23 and lower arm 24. Here, the forces from the snow surface to vehicle frame 21 can be decreased by shock absorbers 22.

The shock absorbers 22 function independently at the left and right sides of the vehicle body, and therefore, cannot minimize the differences in height between the left and right skis 26. According to the present preferred embodiment, the differences in height between the left and right skis 26 of snowmobile 10 are reduced by stabilizer bar 30. Stabilizer bar 30 in the present preferred embodiment is a rod-shaped member, and is shaped such that the middle portion is substantially linear in shape but gradually curves towards the two end portions, and the two ends are facing a direction substantially perpendicular to the substantially linear middle portion.

The middle portion of stabilizer bar 30 is supported at two positions by vehicle frame 21, while the two end portions are supported by lower arms 24. Therefore, when torsion is produced on ski 26, a reactive effect with respect to the torsion will be generated in the stabilizer bar 30 and the torsion on ski 26 can be corrected. The state in which torsion is produced on ski 26 refers to a state where opposite forces in the upward and downward directions are respectively acting on skis 26 at the left and right sides of the vehicle body.

As described above, stabilizer bar 30 is a member for correcting the torsion on ski 26 of which shock absorber 22 is not able to absorb. However, the terrain in which the snowmobile travels is mainly snow surfaces, and snow surfaces change according to various factors such as the weather, the region, and the season. Therefore, the desirability of the reactive effect generated by stabilizer bar 30 also varies according to such factors. In the present preferred embodiment, support member 31 with which the rider of snowmobile 10 can adjust the rigidity of stabilizer bar 30 according to such requirements is used.

When torsion is produced on ski 26, the roll of the vehicle body cannot be effectively minimized if the reactive effect is not readily generated by stabilizer bar 30. In view of this, arm support member 32 is used in the present preferred embodiment. Arm support member 32 supports stabilizer bar 30 in such a way that, when torsion is produced on ski 26, the reactive effect can be readily generated by the stabilizer bar 30 and the roll of the vehicle body effectively minimized.

In addition, in order to improve fuel efficiency and maneuverability, weight reduction in vehicles such as snowmobile 10 has been generally desired. Moreover, since vehicles such as snowmobile 10 are used for traveling on uneven terrains and have to withstand great exterior forces, high vehicle rigidity is also desired in addition to weight reduction. Generally, in order to increase the rigidity of a functional component, the thickness of the component is increased. However, such a design will not only improve the rigidity, it will also increase the weight of the component, which in turn increases the cost. In the present preferred embodiment, by changing the shape of stabilizer bar 30, the weight can be reduced and rigidity increased without increasing the cost.

Hereafter, the structure of stabilizer bar 30 is described in detail, and the possibility of adjusting the rigidity of stabilizer bar 30, the prompt generation of a reactive effect by stabilizer bar 30, and the realization of weight and cost reduction will also be described.

As illustrated in FIGS. 2 and 3, a snowmobile according to the present preferred embodiment includes vehicle frame 21, a pair of lower arms 24 (hereinafter arms) extending from the left and right sides of the vehicle body and attached to vehicle frame 21, a pair of skis 26 attached to the pair of left and right lower arms 24 respectively (in this preferred embodiment, ski 26 and knuckle 25 correspond to the ground contacting parts), and stabilizer bar 30 for correcting torsion on the pair of left and right skis 26, while support member 31 that enables the position to vary at which stabilizer bar 30 is supported is provided on stabilizer bar 30.

By adjusting the supporting position of stabilizer bar 30 (i.e. the position at which stabilizer bar 30 is supported) via support member 31, the length of the portion of stabilizer bar 30 that corrects the torsion can be varied. As a result, the rigidity of stabilizer bar 30 can be easily adjusted.

In the present preferred embodiment, stabilizer bar 30 is supported by lower arm 24 and vehicle frame 21, and support member 31 is attached to vehicle frame 21. Therefore, by changing the position at which stabilizer bar 30 is supported via the support member 31, the length of stabilizer bar 30 between the respective supporting positions at lower arms 24 and vehicle frame 21 can be adjusted, thereby allowing the rigidity of stabilizer bar 30 to be easily adjusted.

Figure 4:
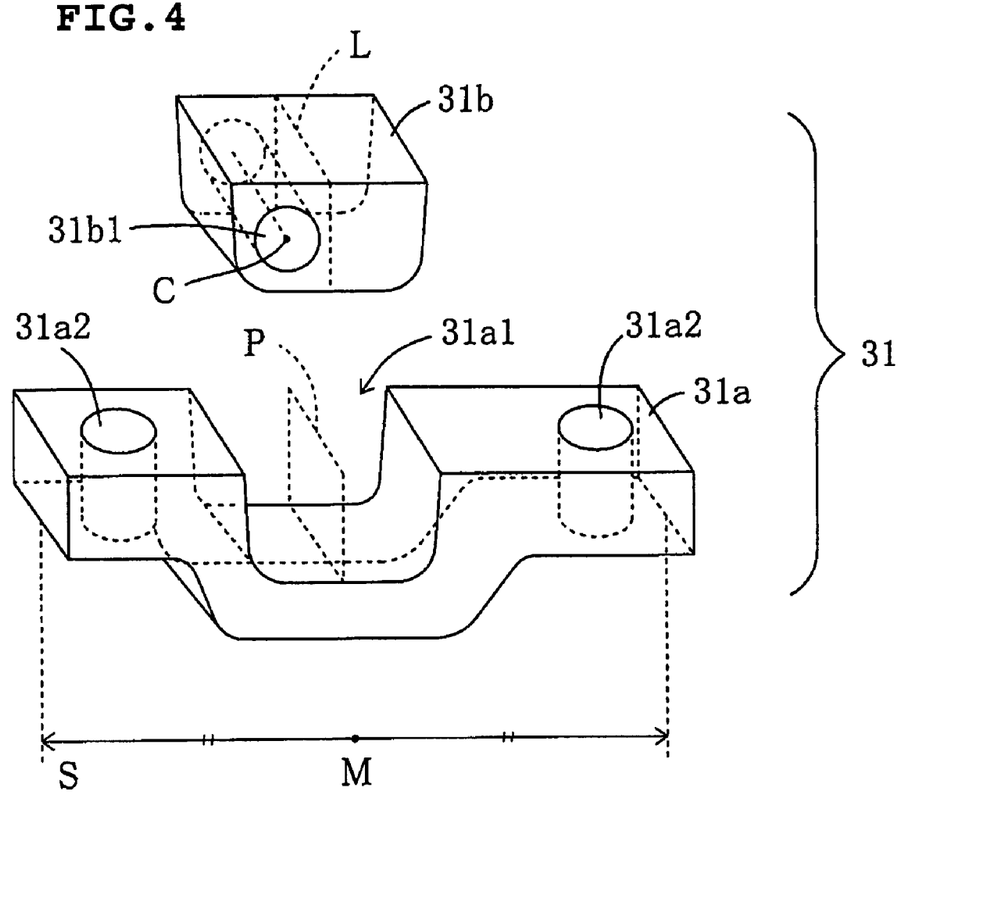
FIG. 4 is a perspective view illustrating the structure of a support member.

FIG. 4 is a drawing that more specifically illustrates the structure of support member 31. As shown in FIG. 4, support member 31 includes a bushing 31b, in which an insertion hole for stabilizer bar 30 is provided, engaging part 31a1 for engaging bushing 31b, and housing 31a that attaches to vehicle frame 21.

Bolt holes 31a2 are provided in housing 31a, and housing 31a is attached to vehicle frame 21 by inserting bolts through bolt holes 31a2. Bushing 31b is preferably substantially rectangular parallelepiped in shape. Engaging part 31a1 is a recess, and the walls of engaging part 31a1 have shapes similar to three of the outer walls (two opposing outer walls and an outer wall adjacent to them) of bushing 31b. Therefore, housing 31a can be attached to vehicle frame 21 while bushing 31b is engaged with engaging part 31a1.

Further, through hole 31b1 is provided on two opposing outer walls (different from the above-described three outer walls) of bushing 31b, and has an internal diameter substantially equal to the external diameter of stabilizer bar 30. Therefore, bushing 31b can be engaged with housing 31a and housing 31a can be attached to vehicle frame 21 while stabilizer bar 30 is inserted in hole 31b1 of bushing 31b.

Accordingly, stabilizer bar 30 can be supported by vehicle frame 21 via support member 31, which has an extremely simple structure. In the present preferred embodiment, support member 31 is attached each on the left and right sides of the vehicle body as illustrated in FIG. 3. The portion of stabilizer bar 30 between the two support members 31 is linear in shape, and stabilizer bar 30 curves towards the left and right ends with respect to support member 31.

Engaging part 31a1 is symmetrical along plane P, which is located at the same distance from the opposing inner walls of the engaging part 31a1, and bushing 31b can be engaged facing a different direction by inverting the front and rear of bushing 31b with respect to plane P. Center C of hole 31b1 in bushing 31b is provided at a position different from the position L in bushing 31b that corresponds to plane P. Therefore when bushing 31b is engaged facing a different direction, center C of hole 31b1, in each respective state, is provided in a different position with respect to housing 31a, and supports stabilizer bar 30 at a different supporting position.

Figure 5A:
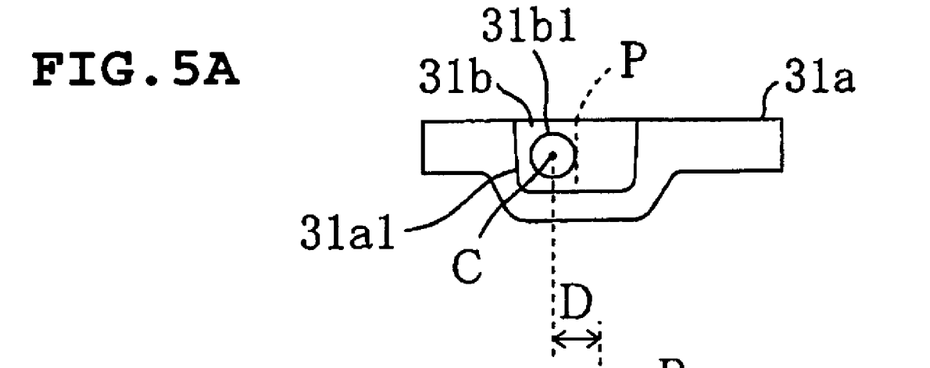
FIGS. 5A to 5D are drawings depicting the changes in the supporting position of a stabilizer bar according to the direction in which a bushing is engaged.
Figure 5B:
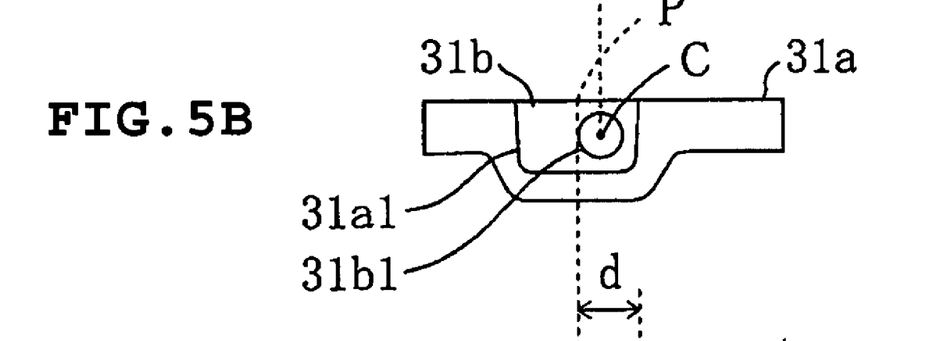

FIGS. 5A and 5B are drawings depicting the changes in the supporting position of stabilizer bar 30 according to the direction in which bushing 31b is engaged. In these drawings, housing 31a is arranged above and below the bushing 31b, and the drawings show the state in which bushing 31b is engaged with engaging part 31a1 by inverting the engaging direction. As described above, since center C of hole 31b1 is located at a position different from plane P, which serves as a pivoting plane for inverting engaging part 31a1, after inversion, center C of hole 31b1 is located at a position symmetrical to the original position along plane P. A variation of C from its original position denoted by D is created.

In the present preferred embodiment, since stabilizer bar 30 is supported in hole 31b1, by changing the direction of bushing 31b as shown in FIGS. 5A and 5B, a variation D in the supporting position of stabilizer bar 30 can be created. Therefore, the supporting position of stabilizer bar 30 can be easily varied. Moreover, supporting member 31 that enables the supporting position of stabilizer bar 30 to be changed can be provided with an extremely simple structure.

Furthermore, since housing 31a is attached to vehicle frame 21 by inserting bolts through bolt holes 31a2, by inverting housing 31a with respect to midpoint M of the length in the longitudinal direction of housing 31a (denoted by S in FIG. 4), housing 31a can be attached to vehicle frame 21 facing a different direction. Also, plane P is provided at a different position from midpoint M. Therefore, when housing 31a is attached to vehicle frame 21 facing a different direction, bushing 31b is, in each respective state, provided at a different position with respect to housing 31a, and supports stabilizer bar 30 at a different supporting position.

Figure 5C:
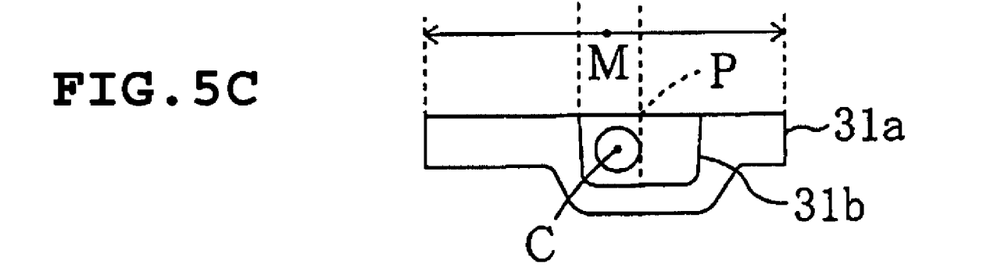

FIGS. 5B and 5C are drawings depicting the changes in the supporting position of stabilizer bar 30 according to the direction in which housing 31a is attached to vehicle frame 21. In these drawings, housing 31a is arranged on top and below, and the drawings show the state in which the direction of housing 31a is inverted. As describe above, since plane P is provided at a different position from midpoint M, after inversion, plane P is located at a position symmetrical to the original position with respect to midpoint M, and a variation of P from its original position denoted by d is created.

In the present preferred embodiment, center C of hole 31b1 is also not in the same position as midpoint M. Therefore, the position of center C of hole 31b1 is shifted to a different position when housing 31a is inverted, and a variation d in the supporting position of stabilizer bar 30 can be created by inverting housing 31a. Therefore, the supporting position of stabilizer bar 30 can be easily varied. Moreover, supporting member 31 that enables the supporting position of stabilizer bar 30 to be changed can be provided with an extremely simple structure.

Figure 5D:
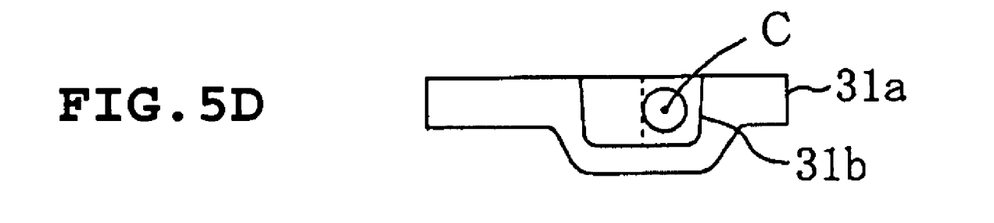

Since bushing 31b can be engaged with engaging part 31a1 by changing the engaging direction of bushing 31b, and housing 31a can be attached to vehicle frame 21 by changing the direction of housing 31a, support member 31 can support stabilizer bar 30 at four different supporting positions. Specifically, even if housing 31a is attached to vehicle frame 21 as shown in FIG. 5C, bushing 31b can be engaged with engaging part 31a1 in a different direction. Therefore, the position of center C of hole 31b1 shown in FIG. 5C can be further changed to the position shown in FIG. 5D, and stabilizer bar 30 can be supported at four different positions shown in FIGS. 5A to 5D.

In the present preferred embodiment, the location at which support member 31 is attached to vehicle frame 21 is positioned in such a way that it inclines forward, and longitudinal direction S shown in FIG. 4 is not parallel to the front-rear direction (i.e. the horizontal direction) when housing 31a is attached to vehicle frame 21. Therefore, by changing the direction of housing 31a, which is attached to vehicle frame 21, and the engaging direction of bushing 31b, the supporting position of stabilizer bar 30 varies in the front-rear direction and the up-down direction of the vehicle body.

Such changes of the supporting position of stabilizer bar 30 to vehicle frame 21 is for changing the length of the portion of stabilizer bar 30 provided between the respective supporting positions at lower arm 24 and vehicle frame 21. Therefore, as long as the length of the portion of stabilizer bar 30 provided between the respective supporting positions at lower arm 24 and vehicle frame 21 can be changed, the variation in the direction of the supporting position is not limited and can be in the front-rear direction or the up-down direction of the vehicle body.

In the present preferred embodiment, the portion of stabilizer bar 30 provided between the respective supporting positions at lower arm 24 and vehicle frame 21 is longer in the front-rear direction of the vehicle body as compared to the up-down direction of the vehicle body. Therefore, as long as the supporting position of stabilizer bar 30 can be changed in at least the front-rear direction of the vehicle body, the rigidity of stabilizer bar 30 can be effectively adjusted according to the changes in the supporting positions.

Figure 6:
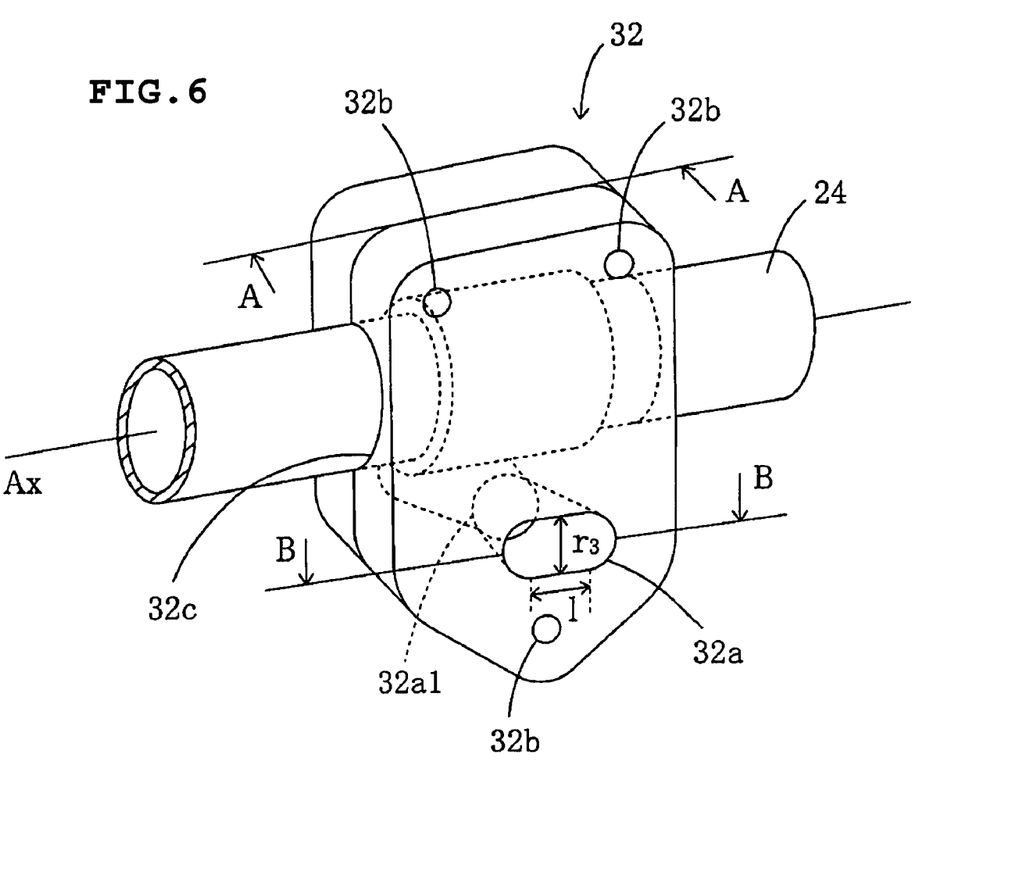
FIG. 6 is a perspective view of an arm support member.
Figure 7:
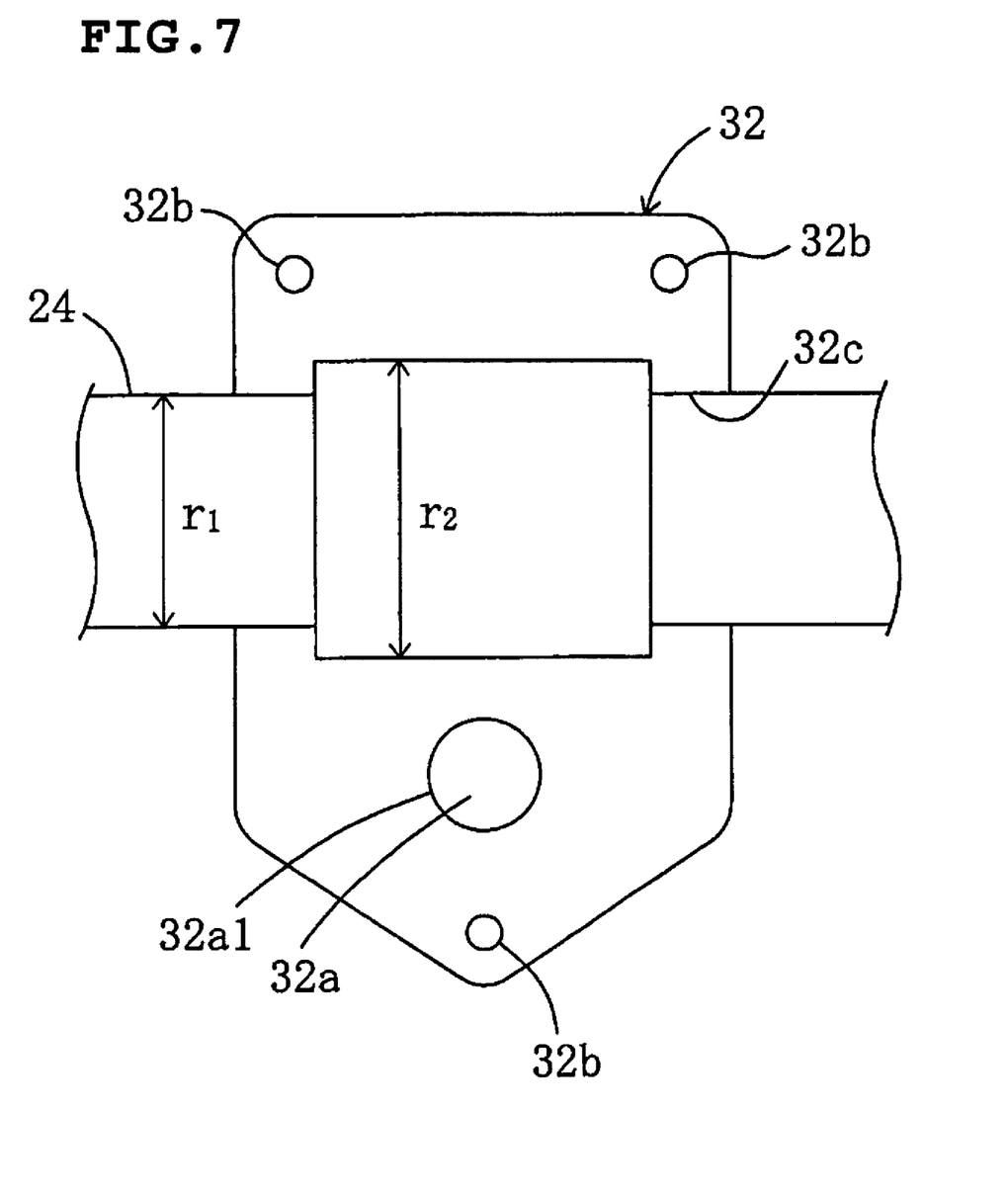
FIG. 7 is a cross section of FIG. 6 along the line A-A.
Figure 8:
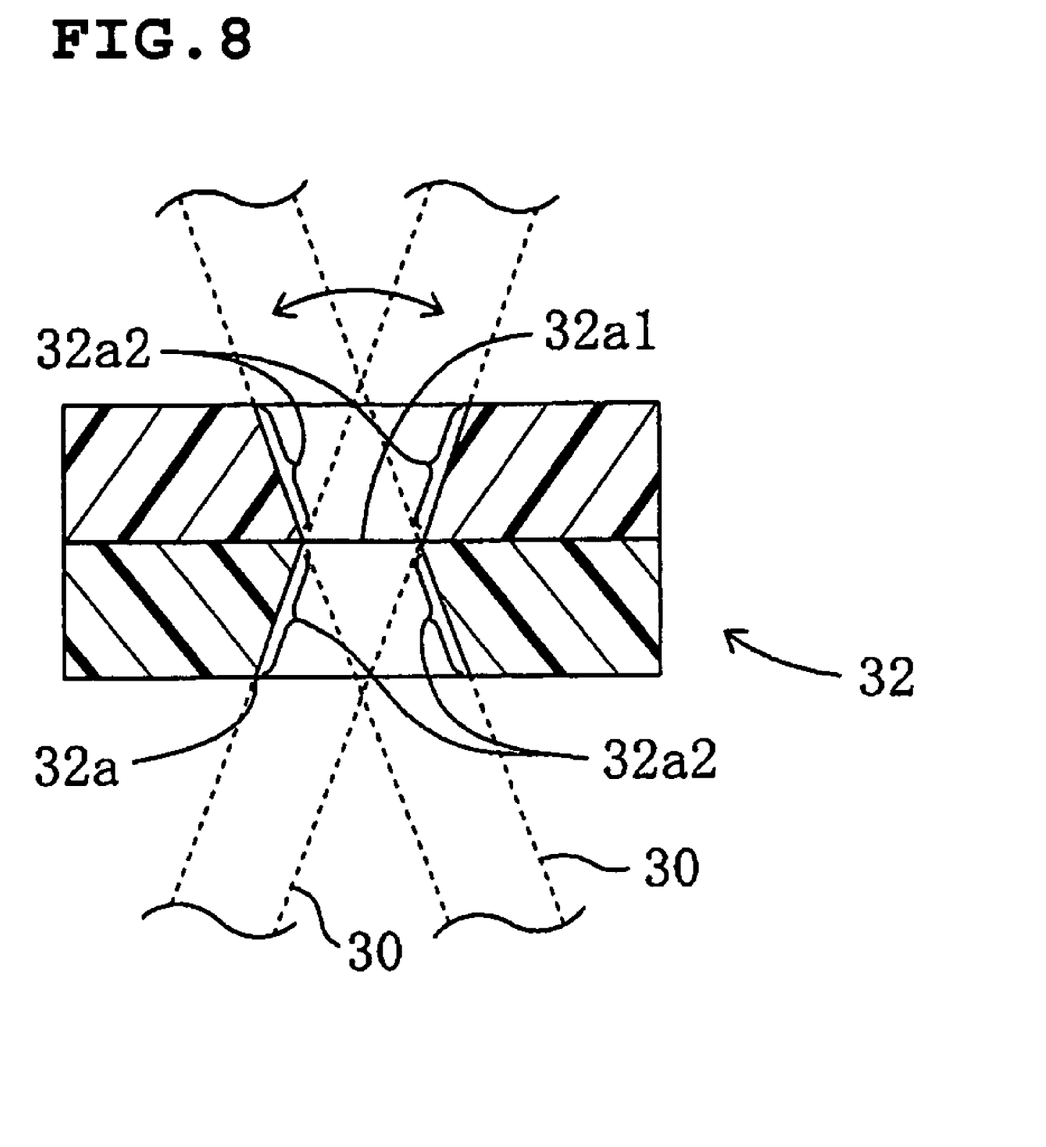
FIG. 8 is a cross section of FIG. 6 along the line B-B.

In the present preferred embodiment, stabilizer bar 30 is supported by lower arm 24 via arm support member 32. FIGS. 6 to 8 depict arm support member 32, where FIG. 6 is a perspective view of arm support member 32, FIG. 7 is a cross section of FIG. 6 along the line A-A, and FIG. 8 is a cross section of FIG. 6 along the line B-B. As illustrated in these drawings, hole 32a into which stabilizer bar 30 is inserted is provided in arm support member 32, and arm support member 32 is further rotatably attached to lower arm 24 using lower arm 24 as an axis.

Arm support member 32 includes two components, and is arranged by attaching the two components facing each other with bolts inserted through bolt holes 32b. Holes 32b pass through each of the two components in the direction in which the two components are attached facing each other. Stabilizer bar 30 can be inserted through the hole 32a. Therefore, by merely inserting stabilizer bar 30 through hole 32a, stabilizer bar 30 can be supported by lower arm 24.

Groove 32c is provided in the middle portion of arm support member 32 such that when the two components are attached facing each other, the inner walls of arm support member 32 define a circular shape. Groove 32c is arranged in such a way that the portion at the center of arm support member 32 has a larger diameter than the portions near the openings. Therefore, groove 32c includes two concentric holes having different internal diameters $r_1$, $r_2$.

The external diameter of lower arm 24 is $r_1$, with a portion of lower arm 24 having an external diameter of $r_2$. The portion of lower arm 24 having an external diameter of $r_2$ corresponds to the portion of groove 32c having an internal diameter of $r_2$. Therefore, the above-described two components can be attached facing each other with bolts while the portion of lower arm 24 having an external diameter of $r_2$ engages the portion of groove 32c having an internal diameter of $r_2$.

Therefore, arm support member 32 is rotatable with respect to axis Ax of lower arm 24. As a result, even if the direction of stabilizer bar 30 changes due to the change in the supporting positions of stabilizer bar 30 with regard to supporting members 31, the direction of hole 32a can be changed accordingly, and stabilizer bar 30 can still be easily inserted into hole 32a.

As described above, groove 32c includes two concentric holes having different internal diameters $r_1$, $r_2$, and lower arm 24 has external diameters $r_1$, $r_2$ that engage these internal diameters. Therefore, arm support member 32 is attached to stabilizer bar 30 in such a way that, with respect to each of the left and right lower arms 24, arm support member 32 is not movable in the direction parallel to axis Ax of respective lower arm 24.

As a result, when forces from the snow surface are received by ski 26 and torsion is produced, correction of torsion by the stabilizer bar 30 can be readily and effectively achieved. More specifically, when the height of the left and right skis 26 differs due to the height of the terrain and the rolling of the vehicle, the height difference in the left and right skis 26 is transferred to lower arm 24 via knuckle 25. Accordingly, forces that cause the left and right lower arms 24 to shift up and down in opposite directions are generated, and stabilizer bar 30 supporting each lower arm 24 generates a reactive force with respect to these forces to correct the torsion.

If arm support member 32 is movable in the direction parallel to axis Ax of each lower arm 24 whenever forces that cause the left and right lower arms 24 to shift up and down in opposite directions are generated, stabilizer bar 30 will be shifted in the left-right direction of the vehicle body and forces from lower arm 24 will not be effectively transferred to stabilizer bar 30. However, in the present preferred embodiment, arm support member 32 is respectively attached to each left and right lower arm 24 in such a way that arm support member 32 is not movable in the direction parallel to axis Ax of each lower arm 24. Hence, stabilizer bar 30 will not be shifted in the left-right direction of the vehicle body when torsion is produced on ski 26.

Therefore, when torsion is produced on ski 26 and forces that cause the left and right lower arms 24 to shift up and down in opposite directions are generated, a reactive force against these forces is readily transferred from stabilizer bar 30 to lower arm 24. As a result, the correction of the torsion by stabilizer bar 30 can be readily and effectively achieved.

Further, a portion 32a1 of the internal diameter of hole 32a provided in arm support member 32 is substantially the same as the external diameter of stabilizer bar 30, and another portion 32a2 of the internal diameter of hole 32a is larger than the external diameter of stabilizer bar 30.

In the cross section B-B shown in FIG. 8, the ranges of portion 32a1 and portion 32a2 of the internal diameter of hole 32a are illustrated, and the pivoting range of stabilizer bar 30 is illustrated by the dashed lines. As shown in this drawing, since portion 32a1 of the internal diameter of hole 32a is substantially the same as the external diameter of stabilizer bar 30, stabilizer bar 30 is always in contact with portion 32a1 of the internal diameter of hole 32a. Accordingly, regardless of how stabilizer bar 30 moves according to, for example, the torsion on ski 26, stabilizer bar 30 will be held by portion 32a1 of the internal diameter of hole 32a. Therefore, when torsion is produced on ski 26 and forces that cause the left and right lower arms 24 to shift up and down in opposite directions are generated, such forces can be transferred to stabilizer bar 30 via lower arm 24.

In addition, since the portion (portion 32a2) other than portion 32a1 of the internal diameter of hole 32a is larger than the external diameter of stabilizer bar 30, portion 32a2 provides stabilizer bar 30 with the flexibility of movement. Therefore, a structure that provides stabilizer bar 30 the flexibility of movement and positioning while readily enabling forces received by ski 26 to be transferred to stabilizer bar 30 can be achieved.

As shown in FIG. 6, the opening of hole 32a is provided with a height $r_3$ in the direction perpendicular to cross section B-B and a cross length 1 in the direction parallel to cross section B-B, and $r_3$ is substantially the same as the external diameter of stabilizer bar 30. Therefore in the present preferred embodiment, stabilizer bar 30 can pivot in a plane (cross section B-B) parallel to axis Ax of lower arm 24 with portion 32a1 of the internal diameter of hole 32a serving as a supporting point.

As described above, in the present preferred embodiment, arm support member 32 is rotatable around axis Ax of lower arm 24, and stabilizer bar 30 can pivot in a plane (cross section B-B) parallel to axis Ax of lower arm 24 with portion 32a1 of the internal diameter of hole 32a serving as a supporting point. Therefore, even when the direction and position of stabilizer bar 30 are changed due to changes in supporting positions of supporting member 31, stabilizer bar 30 can still be easily inserted into and supported by hole 32a by utilizing such rotatability and mobility.

Figure 9:
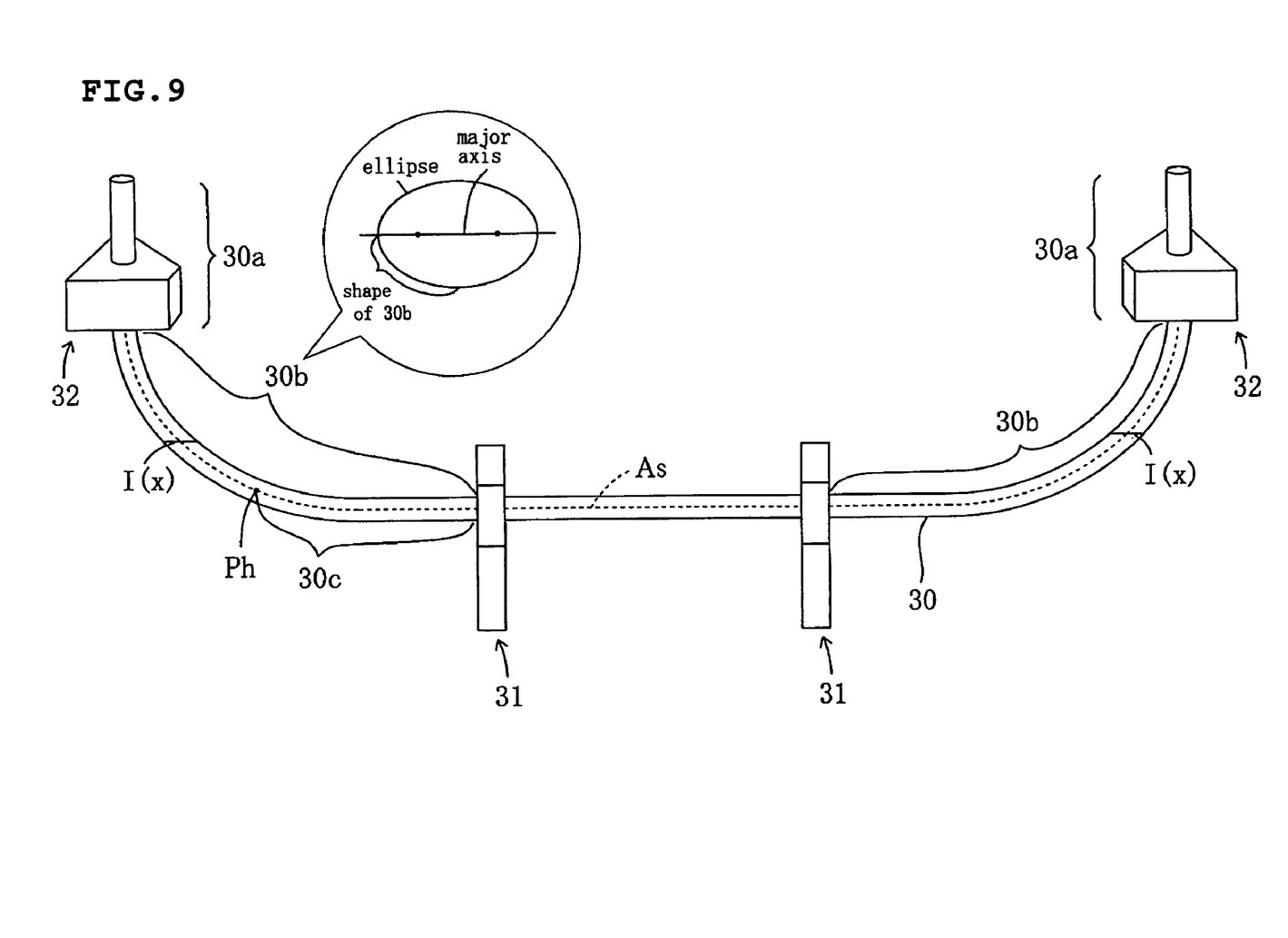
FIG. 9 is a drawing illustrating the stabilizer bar, the support member, and the arm support member when viewed from above a vehicle.
Figure 10:
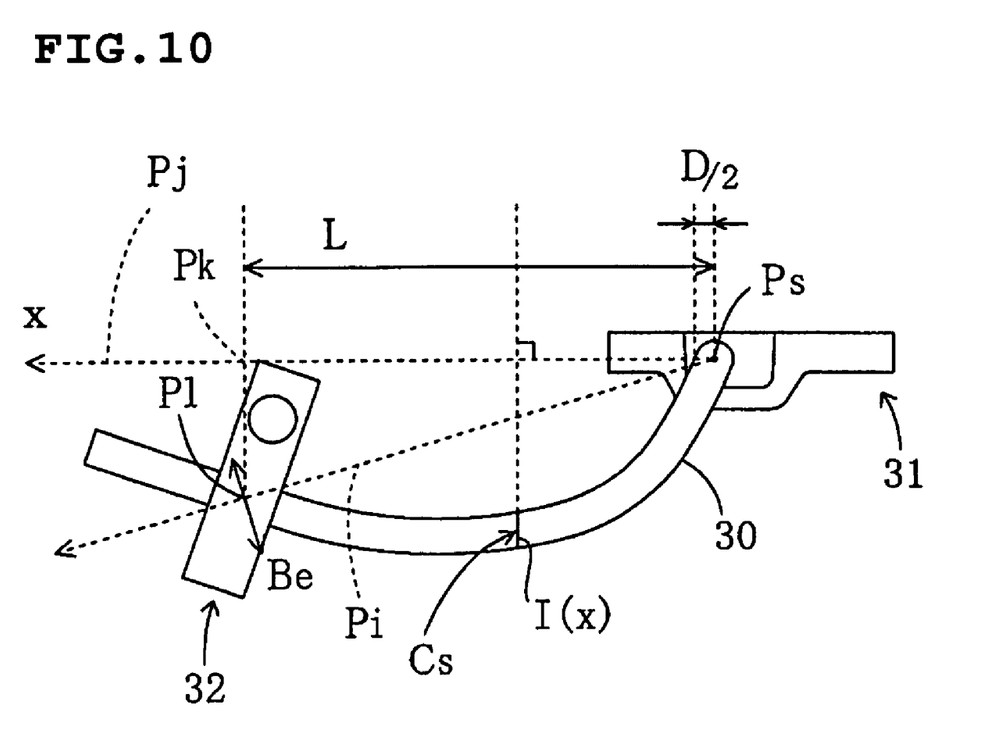
FIG. 10 is a drawing illustrating the stabilizer bar, the support member, and the arm support member when viewed from the left side of the vehicle.

FIGS. 9 and 10 are drawings depicting the appearance of stabilizer bar 30. FIG. 9 is a drawing illustrating stabilizer bar 30, support member 31, and arm support member 32 when viewed from above the vehicle, and FIG. 10 is a drawing illustrating stabilizer bar 30, support member 31, and arm support member 32 when viewed from the left side of the vehicle. As illustrated in these drawings, in the present preferred embodiment, stabilizer bar 30 is bent substantially across the entire portion between support member 31 and arm support member 32. Therefore, a rigid stabilizer bar 30 can be provided with low cost and weight.

Stabilizer bar 30 is supported at two points by support member 31 and arm support member 32, and rigidity can be evaluated based on the resistance against rotation with the supporting position of either support member 31 or arm support member 32 serving as a supporting point. Here, it has been discovered that such rigidity can be increased if stabilizer bar 30 is bent substantially across the entire portion between the supporting positions of these two points.

Therefore, by having a structure in which stabilizer bar 30 is bent substantially across the entire portion between support member 31 and arm support member 32, a relatively more rigid stabilizer bar 30, as compared to stabilizer bars having numerous linear portions between such two points, can be provided. In other words, a more rigid shape can be provided even if the material and weight of the stabilizer bar are the same, and a rigid stabilizer bar 30 can be provided without increasing the cost and weight.

Stabilizer bar 30 can include linear portions in the periphery of the portion supported by support member 31 or arm support member 32. In the present preferred embodiment, linear portions are present at end portions 30a of stabilizer bar 30 that are supported by arm support member 32. Therefore, in the case where such linear portions are present, portion 30b of stabilizer bar 30, which is provided between support member 31 and arm support member 32 and excluding end portions 30a, corresponds to the above-described "substantially entire portion".

As described above, in the present preferred embodiment, stabilizer bar 30 can be readily inserted into hole 32a by utilizing the rotatability of arm support member 32 with respect to lower arm 24 and mobility of stabilizer bar within hole 32a. Therefore, stabilizer bar 30 can also be bent across the entire portion between support member 31 and arm support member 32, without necessarily having linear portions provided at end portions 30a.

Furthermore, in the present preferred embodiment, stabilizer bar 30 has a structure in which the flexural rigidity, which determines the degree of flexure with support member 31 serving as the supporting point, decreases along the portion from support member 31 to arm support member 32.

Since stabilizer bar 30 is supported by support member 31 and arm support member 32, and stabilizer bar 30 is rotatable using the linear portion between the left and right support members 31 as axis As, the rigidity of stabilizer bar 30 can be evaluated using the flexure (in the direction perpendicular to plane Pi, which includes axis As and supporting position P1 of stabilizer bar 30 by arm support member 32 (see arrow Be in FIG. 10)) with respect to supporting point Ps on axis As.

For example, the shape of a rigid stabilizer bar 30 can be qualitatively obtained by evaluating the flexure with respect to supporting point Ps on axis As using simple formulas. Here, assume plane Pj, including axis As, is parallel to the horizontal direction, and x is the distance from axis As along plane Pj, and $I(x)$ is the coefficient of the flexural rigidity along the cross section in the direction perpendicular to plane Pj. Then dx is the infinitesimal interval of position x, $F(x)$ is the force acting in the direction perpendicular to plane Pj with respect to dx, and L is the distance from axis As to projection point Pk of supporting position Pl.

The degree of flexure Y in the direction perpendicular to plane Pj in supporting position Pl can then be qualitatively evaluated based on the following formula (1):

$$Y = \int_{D/2}^{L} \frac{F(x)}{I(x)} dx \quad (1)$$

where D denotes the diameter of stabilizer bar 30.

Here, the degree of flexure Y is considered to be generated by torque T, and if torque T is to be simplified by the formula T=x·F(x), then formula (1) can be written as formula (2) shown below:

$$Y = T \int_{D/2}^{L} \frac{1}{x \cdot I(x)} dx \quad (2)$$

Therefore, in order to minimize the degree of flexure Y (hence, increasing the rigidity of stabilizer bar 30), it is preferable to increase the coefficient of the flexural rigidity I(x) when position x takes a small value. As described above, if stabilizer bar 30 has a structure in which the coefficient of the flexural rigidity I(x), which determines the degree of flexure Y with support member 31 serving as supporting point Ps, decreases along the portion from support member 31 to arm support member 32, the value of formula (2) can be reduced and a rigid stabilizer bar 30 can be provided. As a result, if a material with a certain thickness and weight is to be used, a rigid stabilizer bar 30 can be provided using that material without increasing the thickness and weight thereof.

To express the coefficient of the flexural rigidity I(x) by the product of longitudinal elastic modulus and moment of inertia of area, the stabilizer bar 30 can also have a structure in which the moment of inertia of area, which determines the coefficient of the flexural rigidity I(x), decreases along the portion from support member 31 to arm support member 32. With such a structure, a rigid stabilizer bar 30 can also be provided using a material with a certain thickness and weight without increasing the thickness and weight thereof.

Generally, the coefficient of the flexural rigidity I(x) increases as the cross sectional area of the same material increases Therefore, stabilizer bar 30 can also have a structure in which the area of cross section Cs, which is perpendicular to the horizontal plane (Pj) and parallel to the left-right direction of the vehicle body, of stabilizer bar 30 decreases along the portion from support member 31 to arm support member 32. With such a structure, a rigid stabilizer bar 30 can also be provided using a material with a certain thickness and weight without increasing the thickness and weight thereof.

In the present preferred embodiment, the portion of stabilizer bar 30 between support member 31 and arm support member 32 forms a portion of an ellipse, and the curvature of the portion of stabilizer bar 30 increases along the portion from support member 31 to arm support member 32. Hence, stabilizer bar 30 is formed in such a way that the central axis of portion 30b shown in FIG. 9 corresponds with a portion of an ellipse, and stabilizer bar 30 is supported in such a way that the major axis of the ellipse and the left-right direction of the vehicle body are substantially parallel. As a result, a shape in which the coefficient of the flexural rigidity I(x), which determines the degree of flexure Y with support member 31 serving as supporting point Ps and decreases along the portion from support member 31 to arm support member 32, can be easily provided.

Further, as shown in FIG. 9, no linear portion is included in portion 30c, which is the portion of stabilizer bar 30 between support member 31 and the midpoint Ph of support member 31 and arm support member 32. Such structure can also provide a rigid stabilizer bar 30 without increasing the cost and weight.

As described above, stabilizer bar 30 is supported at two points by support member 31 and arm support member 32, and rigidity can be evaluated based on the resistance against rotation with the supporting position of either support member 31 or arm support member 32 serving as a supporting point. With regard to such evaluation, the rigidity can be increased at least by using a structure in which no linear portion is included in portion 30c, which is the portion of stabilizer bar 30 between support member 31 and the midpoint Ph of support member 31 and arm support member 32.

In the present preferred embodiment, no linear portion is included in portion 30c, which is the portion of stabilizer bar 30 between support member 31 and the midpoint Ph of support member 31 and arm support member 32. According to this structure, a relatively rigid stabilizer bar 30 can be provided as compared to stabilizer bars that include linear portions in portion 30c. Therefore, a more rigid shape can be provided even for a stabilizer bar of the same material and weight, and a rigid stabilizer bar 30 can be provided without increasing the cost and weight.

A structure in which no linear portion is included in portion 30c, which is the portion of stabilizer bar 30 between support member 31 and the midpoint Ph of support member 31 and arm support member 32, can be easily provided by providing portion 30c in an elliptical shape.

In the present preferred embodiment, suspension 20 is preferably a double wishbone suspension including lower arm 24 and upper arm 23 provided above lower arm 24, and the present invention can be applied to a double wishbone suspension.

Arm support member 32 can also be supported by upper arm 23. However, since stabilizer bar 30 produces a reactive effect against forces acting on the arm, it is typical for arm support member 32 to be supported by the arm to which an end of shock absorber 22 is attached (which is lower arm 24 in the present preferred embodiment).

The above-described preferred embodiments are only preferred embodiments of the present invention, but the present invention is not limited to the above-described preferred embodiments. For example, recreational vehicles related to the present invention are not limited to snowmobiles such as that described in the above preferred embodiments. The present invention is also applicable to all vehicles including a structure that corrects torsion of ground contacting parts using a stabilizer bar, such as ATVs and the like.

Moreover, the type of suspension is not limited to a double wishbone suspension. The present invention is also applicable to a strut type suspension, trailing arm type suspension, and the like, if the suspension includes a stabilizer bar for correcting torsion of ground contacting parts, support members that enable the supporting positions to be changed, arm support members supporting the stabilizer bar such that they are not movable along the arms, and the stabilizer bar can be bent across the entire portion between the two points supporting the stabilizer bar.

In addition, as long as the support member supporting the stabilizer bar can vary the supporting position at which the stabilizer bar is supported, it is not necessary to provide a structure in which the housing and bushing defining the support member are inverted. For example, a mechanism that enables members supporting the stabilizer bar or supporting positions to be shifted according to the rotation of the screws, and a structure in which the stabilizer bar is supported on the vehicle frame by such mechanism can be utilized.

The supporting members for changing the supporting position of the stabilizer bar can also be provided on the arm side. In such structure, the rigidity of the stabilizer bar can be easily adjusted by changing the position at which the stabilizer bar is supported by the support members.

The shape of each component described is not limited to the above-described preferred embodiments, and as long as each component can function accordingly, various shapes can be used. For example, although as shown in FIG. 7, the internal diameter $r_2$ at the center portion of arm support member 32 is larger than the internal diameter $r_1$ near the openings and lower arm 24 engages arm support member 32, such structure is not a requisite. For example, the internal diameter at the center portion of arm support member 32 can be smaller than the internal diameter near the openings, and lower arm 24 can engage arm support member 32 by providing the outer diameter of lower arm 24 in a recessed shape. Lower arm 24 can also engage an arm support member 32 formed in a shape with a plurality of protrusions and recesses.

The structure for restricting arm support member 32 from moving in the direction parallel to axis Ax of lower arm 24 is not limited to a protrusion and recess in the interior of arm support member 32. For example, a ring-shaped stopper can be attached to lower arm 24 or a protrusion serving as a stopper can be provided on the external diameter, and such stopper and arm support member 32 are always in contact, thereby restricting the mobility of arm support member 32.

Similarly, a ring-shaped stopper can also be attached to stabilizer bar 30 or a protrusion serving as a stopper can be provided on the external diameter of stabilizer bar 30. Other components can also be provided in various shapes. For example, an opposing flange can be provided on bushing 31b, and the flange can sandwich and engage housing 31a.

In the above-described preferred embodiments, the portion of stabilizer bar 30 between support member 31 and arm support member 32 preferably has an elliptical shape. However, since a circle is a kind of an ellipse, region 30b of stabilizer bar 30 can also be defined by a portion of a circle.

In addition, it is not a requisite for region 30b of stabilizer bar 30 to curve in such a way that it intersects plane Pi as described in the above preferred embodiments. Region 30b or a portion of region 30b can also be provided on plane Pi between support member 31 and arm support member 32. Therefore, stabilizer bar 30 can take on various shapes.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A recreational vehicle comprising:
   a vehicle frame;
   a pair of left and right arms attached to the vehicle frame and extending from the left and right sides of the vehicle frame;
   a pair of left and right ground contacting parts respectively attached to the pair of left and right arms; and
   a stabilizer bar arranged to correct a torsion on the pair of left and right ground contacting parts, the stabilizer bar including a support member capable of changing a position at which the stabilizer bar is supported; wherein
   the support member includes a housing fixed to the vehicle frame and a bushing removably disposed in the housing; and
   the position at which the stabilizer bar is supported is changed by changing the orientation of the bushing in the housing.

2. The recreational vehicle according to claim 1, wherein the support member is arranged to change the position at which the stabilizer bar is supported in at least the front-rear direction of the vehicle frame.

3. The recreational vehicle according to claim 1, wherein the stabilizer bar is attached to the pair of left and right arms and the vehicle frame.

4. The recreational vehicle according to claim 3, wherein the bushing is provided with a hole into which the stabilizer bar is inserted, the housing includes an engaging part with which the bushing engages.

5. The recreational vehicle according to claim 4, wherein the bushing is arranged to be engaged with the engaging part in different orientations, and a position of a center of the hole, with respect to the housing, differs in each different orientation.

6. The recreational vehicle according to claim 1, wherein the stabilizer bar is provided with at least one arm support member arranged to support the stabilizer bar on the pair of left and right arms, the at least one arm support member having a hole arranged to receive the stabilizer bar, and the at least one arm support member is attached to the pair of left and right arms such that the at least one arm support member is rotatable about an axis of the arms.

7. The recreational vehicle according to claim 1, wherein the pair of left and right arms includes a pair of lower arms and a pair of upper arms provided above the lower arms.

8. A recreational vehicle comprising:
   a vehicle frame;
   a pair of left and right arms attached to the vehicle frame and extending from the left and right sides of the vehicle frame;
   a pair of left and right ground contacting parts respectively attached to the pair of left and right arms; and
   a stabilizer bar arranged to correct a torsion on the pair of left and right ground contacting parts, and the stabilizer bar including a pair of arm support members; wherein
   the arm support members are respectively attached to the pair of left and right arms such that the arm support members are immovable in a direction parallel to an axis of each of the pair of left and right arms; and
   the arm support members include a hole arranged to receive the stabilizer bar, and a first portion of an inner diameter of the hole is substantially the same as an external diameter of the stabilizer bar and a second portion of the inner diameter of the hole is larger than the external diameter of the stabilizer bar.

9. The recreational vehicle of claim 8, wherein the stabilizer bar is arranged to pivot in a plane parallel to the axis of the arms with the first portion of the inner diameter of the hole serving as a pivot point.

10. A recreational vehicle comprising:
    a vehicle frame;
    a pair of left and right arms attached to the vehicle frame and extending from the left and right sides of the vehicle frame;
    a pair of left and right ground contacting parts respectively attached to the pair of left and right arms;
    a stabilizer bar arranged to correct a torsion on the pair of left and right ground contacting parts;

at least one support member arranged to rotatably support the stabilizer bar on the vehicle frame using the stabilizer bar as an axis; and at least one arm support member supporting the stabilizer bar on the pair of left and right arms; wherein substantially an entire portion of the stabilizer bar between the at least one support member and the at least one arm support member is bent; and a flexural rigidity of the stabilizer bar decreases along a portion from the at least one support member to the at least one arm support member.

11. The recreational vehicle of claim 10, wherein a moment of inertia of area of the stabilizer bar decreases along the portion from the at least one support member to the at least one arm support member.

12. The recreational vehicle of claim 10, wherein the portion of the stabilizer bar between the at least one support member and the at least one arm support member defines a portion of an ellipse, and a curvature of the portion of the stabilizer bar increases along the portion from the at least one support member to the at least one arm support member.

13. A recreational vehicle comprising:

a vehicle frame;

a pair of left and right arms attached to the vehicle frame and extending from the left and right sides of the vehicle frame;

a pair of left and right ground contacting parts respectively attached to the pair of left and right arms;

a stabilizer bar arranged to correct a torsion on the pair of left and right ground contacting parts;

at least one support member supporting the stabilizer bar on the vehicle frame; and at least one arm support member supporting the stabilizer bar on the pair of left and right arms; wherein substantially an entire portion of the stabilizer bar between the at least one support member and the at least one arm support member is bent; and the at least one support member is arranged to rotatably support the stabilizer bar using the stabilizer bar as an axis, and an area of cross section of the stabilizer bar decreases along the portion from the at least one support member to the at least one arm support member, the area of cross section being perpendicular to a horizontal plane and parallel to the left-right direction of the vehicle frame.

14. The recreational vehicle of claim 13, wherein the portion of the stabilizer bar between the at least one support member and the at least one arm support member defines a portion of an ellipse, and a curvature of the portion of the stabilizer bar increases along the portion from the at least one support member to the at least one arm support member.

15. A recreational vehicle comprising:

a vehicle frame;

a pair of left and right arms attached to the vehicle frame and extending from the left and right sides of the vehicle frame;

a pair of left and right ground contacting parts respectively attached to the pair of left and right arms;

a stabilizer bar arranged to correct a torsion on the pair of left and right ground contacting parts;

at least one support member arranged to rotatably support the stabilizer bar on the vehicle frame using the stabilizer bar as an axis; and at least one arm support member supporting the stabilizer bar on the pair of left and right arms; wherein a portion of the stabilizer bar between the at least one support member and the midpoint between the at least one support member and the at least one arm support member includes no linear portions; and a cross-sectional shape of at least one portion of the stabilizer bar is different from a cross-section shape of the remaining portions of the stabilizer bar.

16. The recreational vehicle according to claim 15, wherein the portion between the at least one support member and the midpoint between the at least one support member and the at least one arm support member defines a portion of an ellipse.

* * * * *